(12) United States Patent
Kusumoto et al.

(10) Patent No.: US 11,049,653 B2
(45) Date of Patent: Jun. 29, 2021

(54) MULTI-LAYER CERAMIC ELECTRONIC COMPONENT

(71) Applicant: Taiyo Yuden Co., Ltd., Tokyo (JP)

(72) Inventors: Shoji Kusumoto, Tokyo (JP); Ryo Ono, Tokyo (JP); Tetsuhiko Fukuoka, Tokyo (JP); Akihiko Kono, Tokyo (JP); Shota Tanaka, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 16/584,209

(22) Filed: Sep. 26, 2019

(65) Prior Publication Data
US 2020/0098519 A1    Mar. 26, 2020

(30) Foreign Application Priority Data

Sep. 26, 2018   (JP) .............................. JP2018-180253

(51) Int. Cl.
*H01G 4/12* (2006.01)
*H01G 4/30* (2006.01)

(52) U.S. Cl.
CPC ............. *H01G 4/1227* (2013.01); *H01G 4/30* (2013.01)

(58) Field of Classification Search
CPC ........ H01G 4/12; H01G 4/1227; H01G 4/232; H01G 4/2325; H01G 4/30
See application file for complete search history.

(56) References Cited

U.S. PATENT DOCUMENTS

| | | | | |
|---|---|---|---|---|
| 10,446,321 B2 * | 10/2019 | Noda | ...................... | C03C 3/087 |
| 2012/0234462 A1 | 9/2012 | Matsui et al. | | |
| 2016/0196918 A1 * | 7/2016 | Hong | ...................... | H01G 4/232 |
| | | | | 174/260 |
| 2016/0351335 A1 * | 12/2016 | Kato | ........................ | H01G 4/12 |
| 2017/0076866 A1 * | 3/2017 | Okai | ........................ | H01G 4/30 |
| 2017/0076867 A1 * | 3/2017 | Okai | ....................... | H01G 4/242 |
| 2017/0287643 A1 * | 10/2017 | Kobayashi | ............. | H01G 4/232 |
| 2019/0164693 A1 * | 5/2019 | Ono | ....................... | H01G 4/012 |
| 2019/0180935 A1 * | 6/2019 | Kato | ........................ | H01G 4/30 |

FOREIGN PATENT DOCUMENTS

JP           2012-209539 A     10/2012

* cited by examiner

*Primary Examiner* — Nathan Milakovich
(74) *Attorney, Agent, or Firm* — Saliwanchik, Lloyd & Eisenschenk (57) ABSTRACT

A multi-layer ceramic electronic component includes a multi-layer unit and a side margin. The multi-layer unit includes ceramic layers laminated in a first direction, internal electrodes disposed between the ceramic layers, a main surface that faces in the first direction, and a side surface that faces in a second direction orthogonal to the first direction, the internal electrodes being exposed from the side surface. The side margin includes a side-surface-covering portion that is disposed on the side surface, and an end portion that includes an extended portion extending from the side surface to the main surface and having a first dimension of 0.1 µm or more in the first direction and a second dimension of 0.1 µm or more in the second direction.

5 Claims, 9 Drawing Sheets

MULTI-LAYER CERAMIC ELECTRONIC COMPONENT

CROSS-REFERENCE TO RELATED APPLICATION

This application claims priority to Japanese Application No. 2018-180253, filed Sep. 26, 2018; which is hereby incorporated by reference in their entirety.

BACKGROUND

The present disclosure relates to a multi-layer ceramic electronic component including side margins provided in a later step.

In recent years, along with miniaturization of electronic devices and achievement of high performance thereof, there have been increasingly strong demands for miniaturization and increase in capacitance with respect to multi-layer ceramic capacitors used in the electronic devices. In order to meet those demands, it is effective to enlarge internal electrodes of the multi-layer ceramic capacitor. In order to enlarge the internal electrodes, it is necessary to thin side margins for ensuring insulation properties of the periphery of the internal electrodes.

Meanwhile, in a general method of producing a multi-layer ceramic capacitor, it is difficult to form side margins having a uniform thickness because of precision in each step (e.g., patterning of internal electrodes, cutting of a multi-layer sheet, etc.). Therefore, in such a method of producing a multi-layer ceramic capacitor, as the side margins are made thinner, it is more difficult to ensure insulation properties of the periphery of the internal electrodes.

Japanese Patent Application Laid-open No. 2012-209539 discloses a technique of providing side margins in a later step. In other words, in this technique, a multi-layer sheet is cut to produce a multi-layer unit whose internal electrodes are exposed from the side surfaces of the multi-layer unit, and side margins are provided to the side surfaces. This enables side margins having a uniform thickness to be formed and thus enables insulation properties of the periphery of the internal electrodes to be ensured also when the side margins are made thin.

SUMMARY

In the multi-layer ceramic capacitor including the side margins provided in a later step, moisture is likely to infiltrate along a gap between the side surface of the multi-layer unit and the side margin. Further, as the side margin is made thinner, moisture is more likely to pass through the side margin in the thickness direction thereof and reach the side surface of the multi-layer unit. This makes it difficult to ensure insulation properties between the internal electrodes, which are exposed from the side surfaces of the multi-layer unit, in the multi-layer ceramic capacitor.

In view of the circumstances as described above, it is desirable to provide a multi-layer ceramic electronic component having optimal moisture resistance.

According to an embodiment of the present disclosure, there is provided a multi-layer ceramic electronic component including a multi-layer unit and a side margin.

The multi-layer unit includes ceramic layers laminated in a first direction, internal electrodes disposed between the ceramic layers, a main surface that faces in the first direction, and a side surface that faces in a second direction orthogonal to the first direction, the internal electrodes being exposed from the side surface.

The side margin includes a side-surface-covering portion that is disposed on the side surface, and an end portion that includes an extended portion extending from the side surface to the main surface and having a first dimension of 0.1 µm or more in the first direction and a second dimension of 0.1 µm or more in the second direction.

In this configuration, since the end portion of the side margin extends onto the main surface of the multi-layer unit, the peeling of the side margin can be suppressed. Further, in this configuration, a path through which moisture infiltrates from the main surface of the multi-layer unit to between the multi-layer unit and the side margin and reaches a region, in which the internal electrodes are disposed, on the side surface of the multi-layer unit becomes long. This provides high moisture resistance to the multi-layer ceramic electronic component.

The first dimension may be 0.1 µm or more, and the second dimension may be 5 µm or more.

The first dimension may be 0.5 µm or more, and the second dimension may be 1 µm or more.

In those configurations, higher moisture resistance is obtained.

The first dimension may be 3 µm or less, and the second dimension may be 10 µm or less.

In the multi-layer ceramic electronic component, while a portion on the main surface of the multi-layer unit at the end portion of the side margin is suppressed to be small, high moisture resistance can be obtained.

The side-surface-covering portion may have a dimension of 10 µm or more in the second direction, and the side-surface-covering portion may have a porosity of 10% or less.

Further, the end portion may have a porosity lower than the porosity of the side-surface-covering portion.

The end portion of the side margin has a low porosity, and thus moisture is less likely to infiltrate into the end portion. Accordingly, the end portion of the side margin can inhibit moisture from passing therethrough even if the end portion is rounded and thus thinner than the side-surface-covering portion. This provides higher moisture resistance to the multi-layer ceramic electronic component.

It is possible to provide a multi-layer ceramic electronic component having optimal moisture resistance.

These and other objects, features and advantages of the present disclosure will become more apparent in light of the following detailed description of embodiments thereof, as illustrated in the accompanying drawings.

DETAILED DESCRIPTION OF EMBODIMENTS

Hereinafter, an embodiment of the present disclosure will be described with reference to the figures.

In the figures, an X axis, a Y axis, and a Z axis orthogonal to one another are shown as appropriate. The X axis, the Y axis, and the Z axis are common in all figures.

1. Overall Configuration of Multi-layer Ceramic Capacitor 10

Figure 1:
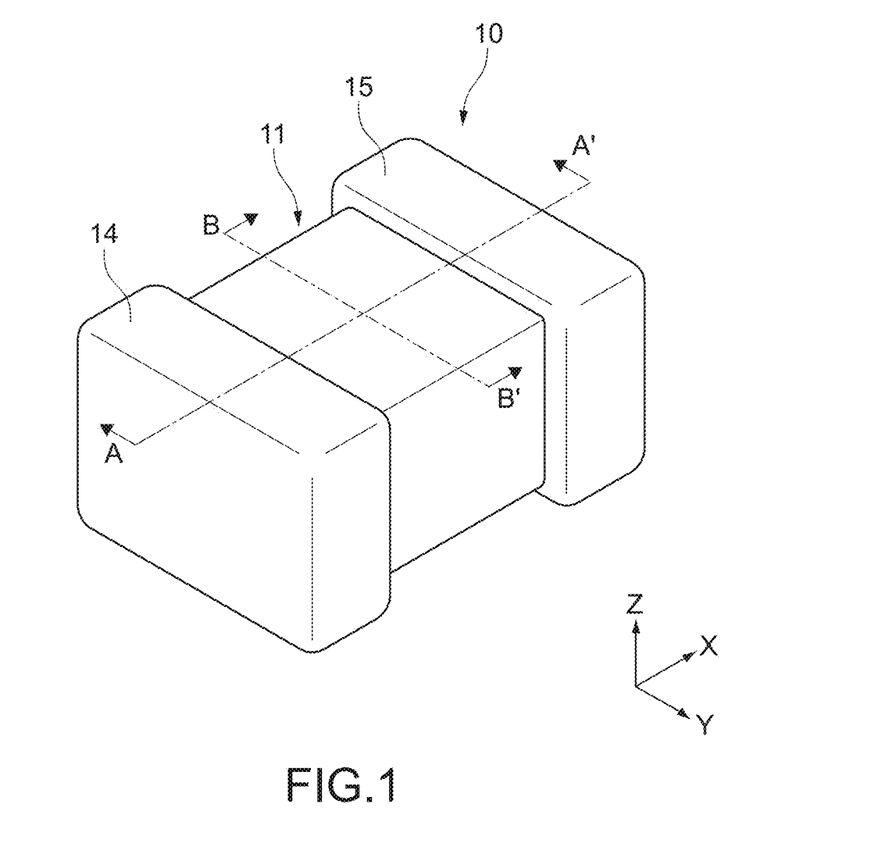
FIG. 1 is a perspective view of a multi-layer ceramic capacitor according to an embodiment of the present disclosure.
Figure 2:
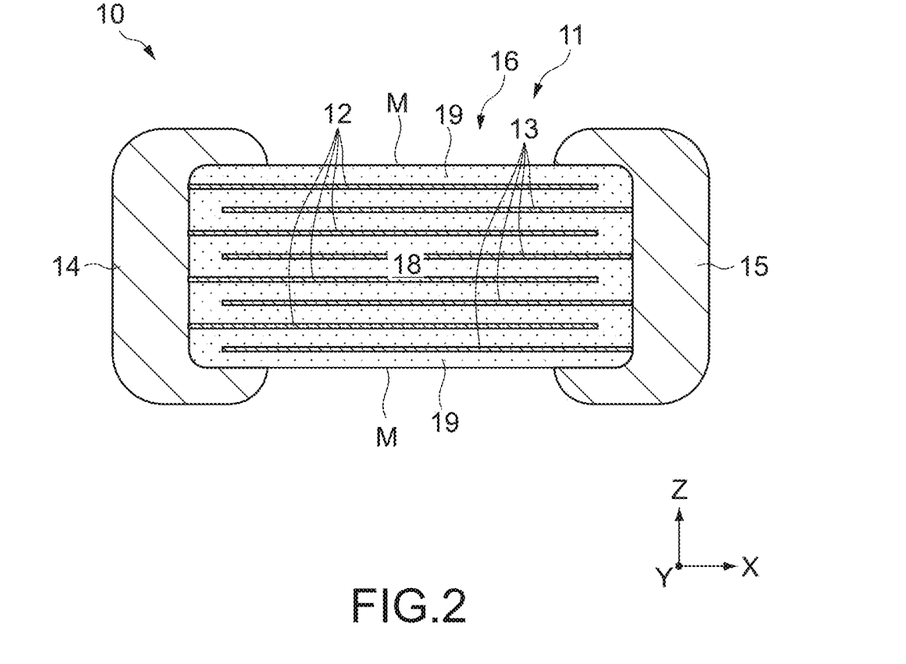
FIG. 2 is a cross-sectional view of the multi-layer ceramic capacitor taken along the A-A' line in FIG. 1.
Figure 3:
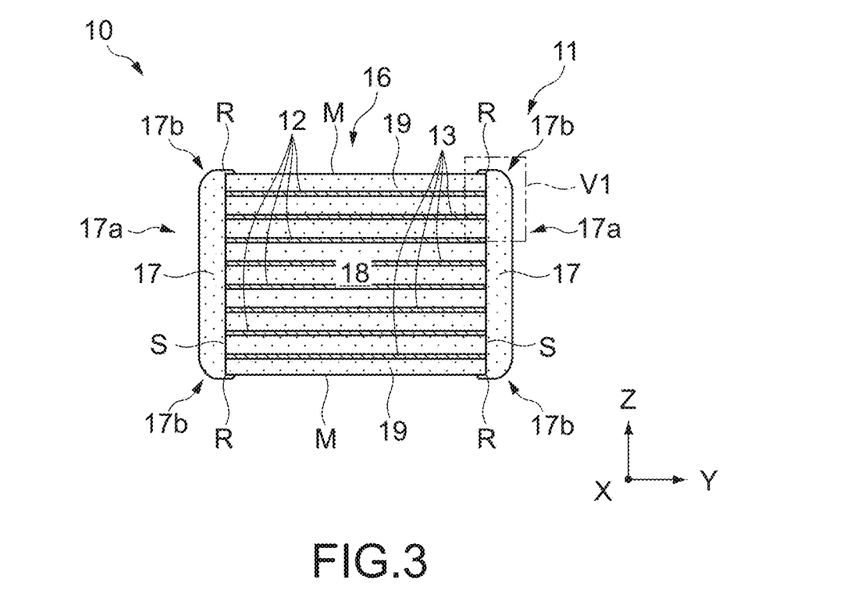
FIG. 3 is a cross-sectional view of the multi-layer ceramic capacitor taken along the B-B' line in FIG. 1.

FIGS. 1 to 3 each show a multi-layer ceramic capacitor 10 according to an embodiment of the present disclosure. FIG. 1 is a perspective view of the multi-layer ceramic capacitor 10. FIG. 2 is a cross-sectional view of the multi-layer ceramic capacitor 10 taken along the A-A' line in FIG. 1. FIG. 3 is a cross-sectional view of the multi-layer ceramic capacitor 10 taken along the B-B' line in FIG. 1.

The multi-layer ceramic capacitor 10 includes a ceramic body 11, a first external electrode 14, and a second external electrode 15. Typically, the ceramic body 11 is formed as a hexahedron having two main surfaces facing in the Z-axis direction, two side surfaces facing in the Y-axis direction, and two end surfaces facing in the X-axis direction.

The first external electrode 14 and the second external electrode 15 cover the end surfaces of the ceramic body 11 and face each other in the X-axis direction while sandwiching the ceramic body 11 therebetween. The first external electrode 14 and the second external electrode 15 extend to the main surfaces and the side surfaces from the end surfaces of the ceramic body 11. With this configuration, both of the first external electrode 14 and the second external electrode 15 have U-shaped cross sections parallel to the X-Z plane and the X-Y plane.

It should be noted that the shapes of the first external electrode 14 and the second external electrode 15 are not limited to those shown in FIG. 1. For example, the first external electrode 14 and the second external electrode 15 may extend to one of the main surfaces from the end surfaces of the ceramic body 11 and have L-shaped cross sections parallel to the X-Z plane. Further, the first external electrode 14 and the second external electrode 15 do not need to extend to any of the main surfaces and the side surfaces.

The first and second external electrodes 14 and 15 are each formed of a good conductor of electricity. Examples of the good conductor of electricity forming the first and second external electrodes 14 and 15 include a metal mainly containing copper (Cu), nickel (Ni), tin (Sn), palladium (Pd), platinum (Pt), silver (Ag), gold (Au), or the like or an alloy of them.

The ceramic body 11 is formed of dielectric ceramics and includes a multi-layer unit 16 and side margins 17. The multi-layer unit 16 has two main surfaces M facing in the Z-axis direction and two side surfaces S facing in the Y-axis direction. The side margins 17 cover the two side surfaces S of the multi-layer unit 16.

The multi-layer unit 16 has a configuration in which a plurality of flat plate-like ceramic layers extending along the X-Y plane are laminated in the Z-axis direction. The multi-layer unit 16 includes a capacitance forming unit 18 and covers 19. The covers 19 cover the capacitance forming unit 18 from above and below in the Z-axis direction to form the two main surfaces M of the multi-layer unit 16.

The capacitance forming unit 18 includes a plurality of first internal electrodes 12 and a plurality of second internal electrodes 13 that are disposed between the ceramic layers. The first and second internal electrodes 12 and 13 each have a sheet-like shape extending along the X-Y plane. The first and second internal electrodes 12 and 13 are alternately disposed along the Z-axis direction. In other words, the first internal electrode 12 and the second internal electrode 13 face each other in the Z-axis direction while sandwiching the ceramic layer therebetween.

The first and second internal electrodes 12 and 13 are formed over the entire width of the capacitance forming unit 18 in the Y-axis direction and are exposed from both the side surfaces S of the multi-layer unit 16. In the ceramic body 11, the side margins 17 that cover both the side surfaces S of the multi-layer unit 16 ensure insulation properties between the first internal electrodes 12 and the second internal electrodes 13, which are adjacent to each other, on both the side surfaces S of the multi-layer unit 16.

The first internal electrodes 12 are drawn to one of the end portions of the ceramic body 11. The second internal electrodes 13 are drawn to the other end portion of the ceramic body 11. With this configuration, the first internal electrodes 12 are connected to only the first external electrode 14, and the second internal electrodes 13 are connected to only the second external electrode 15.

With such a configuration, when a voltage is applied between the first external electrode 14 and the second external electrode 15 in the multi-layer ceramic capacitor 10, the voltage is applied to the ceramic layers between the first internal electrodes 12 and the second internal electrodes 13. Thus, the multi-layer ceramic capacitor 10 stores charge corresponding to the voltage applied between the first external electrode 14 and the second external electrode 15.

In the ceramic body 11, in order to increase capacitances of the ceramic layers provided between the first internal electrodes 12 and the second internal electrodes 13, dielectric ceramics having a high dielectric constant is used. For the dielectric ceramics having a high dielectric constant, for example, a material having a Perovskite structure containing barium (Ba) and titanium (Ti), which is typified by barium titanate ($BaTiO_3$), is used.

It should be noted that the ceramic layer may have a composition based on strontium titanate ($SrTiO_3$), calcium titanate ($CaTiO_3$), magnesium titanate ($MgTiO_3$), calcium zirconate ($CaZrO_3$), calcium zirconate titanate ($Ca(Zr,Ti)O_3$), barium zirconate ($BaZrO_3$), titanium oxide ($TiO_2$), or the like.

The first and second internal electrodes 12 and 13 are each formed of a good conductor of electricity. Examples of the good conductor of electricity forming the first and second internal electrodes 12 and 13 typically include nickel (Ni), and other than nickel (Ni), include a metal or alloy mainly containing copper (Cu), palladium (Pd), platinum (Pt), silver (Ag), gold (Au), or the like.

It should be noted that the multi-layer ceramic capacitor 10 according to this embodiment only needs to include the multi-layer unit 16 and the side margins 17, and other configurations of the multi-layer ceramic capacitor 10 can be changed as appropriate. For example, the number of first and second internal electrodes 12 and 13 can be determined as appropriate according to the size and performance expected for the multi-layer ceramic capacitor 10.

2. Detailed Configuration of Side Margin 17

As shown in FIG. 3, each side margin 17 includes a side-surface-covering portion 17a disposed at the center thereof in the Z-axis direction and end portions 17b disposed at both end portions thereof in the Z-axis direction. The side-surface-covering portion 17a is formed as a flat portion, which is formed to have a flat plate-like shape and has a substantially uniform thickness in the Y-axis direction. The end portions 17b extend outward in the Z-axis direction from the side-surface-covering portion 17a and slightly climb on the main surfaces M from the side surface S of the multi-layer unit 16.

Figure 4:
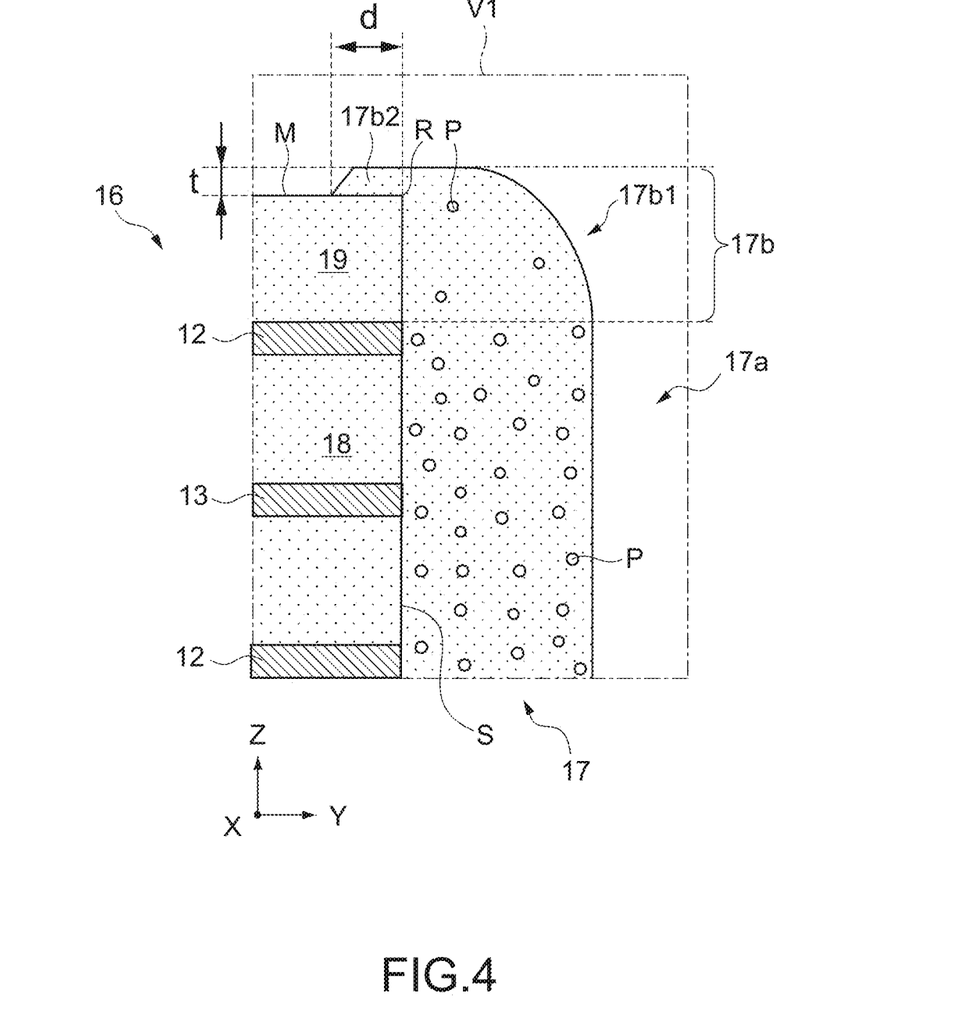
FIG. 4 is a partially enlarged cross-sectional view of a region V1 of the multi-layer ceramic capacitor shown in FIG. 3.

FIG. 4 is a partially enlarged cross-sectional view of a region V1 of the multi-layer ceramic capacitor 10, which is surrounded by a chain line of FIG. 3. In other words, FIG. 4 shows the vicinity of an end portion 17b of the side margin 17, which is shown in the upper right of FIG. 3. It should be noted that the other three end portions 17b of the side margins 17 are also configured to be similar to the end portion 17b shown in FIG. 4.

The boundary between the side-surface-covering portion 17a and the end portion 17b of the side margin 17 in the Z-axis direction corresponds to the boundary between the capacitance forming unit 18 and the cover 19. In other words, the end portion 17b is defined as an outward region in the Z-axis direction with respect to the outermost layer of the first and second internal electrodes 12 and 13 in the Z-axis direction. The end portion 17b shown in FIG. 4 is disposed on the upper side in the Z-axis direction of the first internal electrode 12 that is uppermost in the Z-axis direction.

The end portion 17b of the side margin 17 includes a curved portion 17b1 and an extended portion 17b2. The curved portion 17b1 extends in the Z-axis direction from the side-surface-covering portion 17a to a ridge R connecting the side surface S and the main surface M of the multi-layer unit 16. The extended portion 17b2 is continuous from the curved portion 17b1 and extends inward in the Y-axis direction from the ridge R of the multi-layer unit 16 along the main surface M of the multi-layer unit 16.

In such a manner, the ridge R of the multi-layer unit 16 is covered with the end portion 17b of the side margin 17 and thus protected. Accordingly, in the ceramic body 11, external impact is not directly applied to the ridge R of the multi-layer unit 16. Therefore, in the ceramic body 11, damages such as a crack to be generated from the ridge R of the multi-layer unit 16 can be inhibited from occurring.

Further, the curved portion 17b1 of the side margin 17 is rounded. In other words, the outer surface of the curved portion 17b1 is curved so as to protrude outward. Therefore, an external force is less likely to be locally applied to the ridge of the ceramic body 11, which is formed by the end portion 17b of the side margin 17. Accordingly, high impact resistance is obtained in the multi-layer ceramic capacitor 10.

Furthermore, in the side margin 17, the amount of dispersion of pores P of the end portion 17b is smaller than that of the side-surface-covering portion 17a. In other words, in the side margin 17, a porosity of the end portion 17b is lower than a porosity of the side-surface-covering portion 17a.

Here, the porosity is defined as a proportion of the areas of the pores P in an image where the cross section of the side margin 17 appears.

The porosity of the side-surface-covering portion 17a can be calculated in a region within a predetermined range extending in the Z-axis direction from the boundary with the end portion 17b. The predetermined range of the side-surface-covering portion 17a can be set to, for example, three times as large as the dimension of the side-surface-covering portion 17a in the Y-axis direction at the boundary with the end portion 17b. The porosity of the end portion 17b can be calculated in the entire region of the end portion 17b.

With this configuration, moisture is less likely to infiltrate into the inside of the end portion 17b. Therefore, while the end portion 17b has a smaller thickness as a distance from the side-surface-covering portion 17a increases, the end portion 17b can inhibit moisture from passing therethrough in the Y-axis direction. This can provide high moisture resistance to the multi-layer ceramic capacitor 10.

In the side margin 17, it is favorable that the end portion 17b has a porosity of 5% or less. Further, it is more favorable that the dimension (thickness) of the side-surface-covering portion 17a in the Y-axis direction is 10 μm or more and that the side-surface-covering portion 17a has a porosity of 10% or less. With those configurations, the moisture resistance of the multi-layer ceramic capacitor 10 is further improved.

Further, in the side margin 17, the end portion 17b seamlessly extends from the side surface S to the main surface M of the multi-layer unit 16. With this configuration, the extended portion 17b2 climbs on the main surface M, and thus the side margin 17 holds the multi-layer unit 16 in the Z-axis direction. Thus, the side margin 17 is less likely to be peeled from the side surface S of the multi-layer unit 16, and high moisture resistance can be obtained.

Further, when the extended portion 17b2 is provided, a path through which moisture infiltrates between the multi-layer unit 16 and the side margin 17 and reaches the capacitance forming unit 18 becomes elongated. Additionally, the path for moisture is bent by 90° at the ridge R of the multi-layer unit 16. This makes it difficult for moisture to reach the capacitance forming unit 18 in the multi-layer ceramic capacitor 10.

FIG. 4 shows a thickness t of the extended portion 17b2 and an extended amount d thereof onto the main surface M of the multi-layer unit 16. In other words, the thickness t represents a first dimension of the extended portion 17b2 in the Z-axis direction, and the extended amount d represents a second dimension of the extended portion 17b2 in the Y-axis direction. In order to effectively obtain the above-mentioned effect generated by the extended portion 17b2, it is necessary to ensure a certain size of the thickness t and the extended amount d.

Specifically, in the multi-layer ceramic capacitor 10, the thickness t of the extended portion 17b2 is set to 0.1 μm or more, and the extended amount d of the extended portion 17b2 is set to 0.1 μm or more. Accordingly, in the multi-layer ceramic capacitor 10, an effect of improving the moisture resistance by the extended portion 17b2 of the side margin 17 can be effectively obtained.

Further, in the multi-layer ceramic capacitor 10, it is favorable to set the extended amount d of the extended portion 17b2 to 5 μm or more for the purpose of further improvement in moisture resistance. If a large thickness t of the extended portion 17b2, i.e., 0.5 μm or more, can be ensured, and if the extended amount d of the extended portion 17b2 is set to 1 μm or more, further moisture resistance equal to that described above is obtained.

It should be noted that in the multi-layer ceramic capacitor 10, it is favorable to set the thickness t of the extended portion 17b2 to 3 μm or less and to set the extended amount d of the extended portion 17b2 to 10 μm or less. Accordingly, in the multi-layer ceramic capacitor 10, the change in shape due to the extended portion 17b2 provided to the side margin 17 can be substantially ignored.

3. Method of Producing Multi-layer Ceramic Capacitor 10

Figure 5:
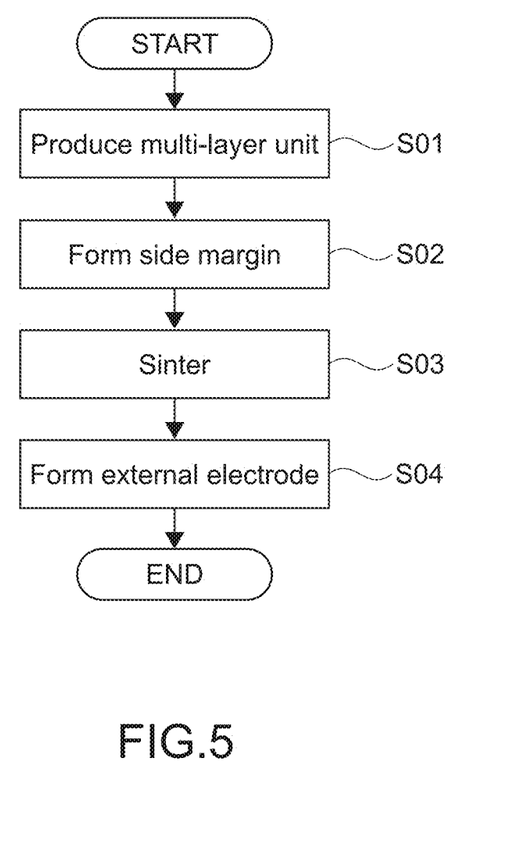
FIG. 5 is a flowchart showing a method of producing the multi-layer ceramic capacitor.

FIG. 5 is a flowchart showing a method of producing the multi-layer ceramic capacitor 10. FIGS. 6 to 10 are views each schematically showing a production process of the multi-layer ceramic capacitor 10. Hereinafter, the method of producing the multi-layer ceramic capacitor 10 will be described according to FIG. 5 with reference to FIGS. 6 to 10 as appropriate.

3.1 Step S01: Production of Multi-layer Unit

Figure 6:
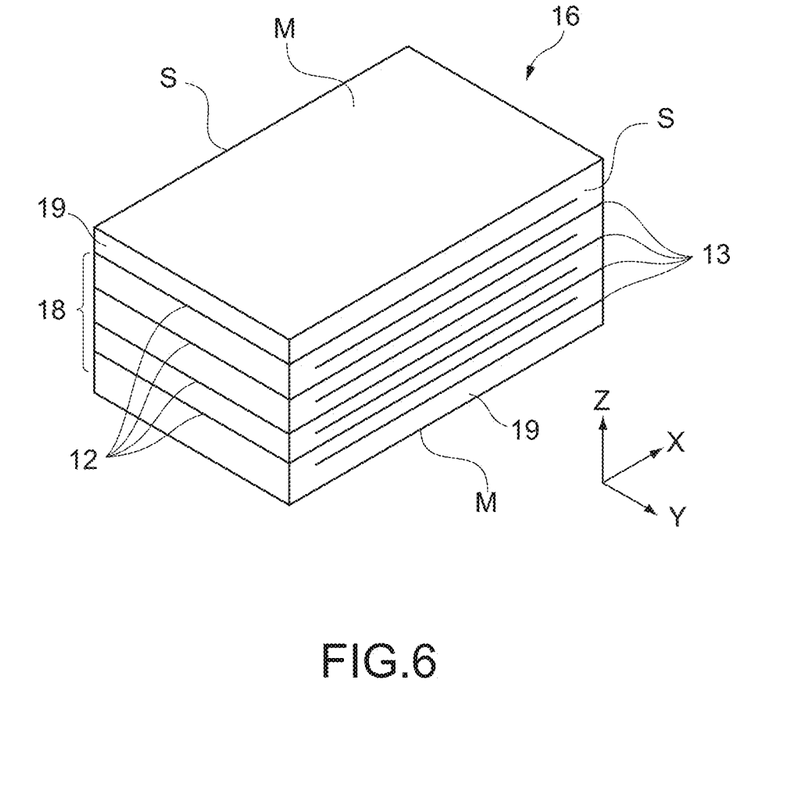
FIG. 6 is a perspective view of an unsintered multi-layer unit produced in Step S01 of the production method described above.

In Step S01, an unsintered multi-layer unit 16 shown in FIG. 6 is produced. The multi-layer unit 16 includes a plurality of laminated unsintered dielectric green sheets on which the first and second internal electrodes 12 and 13 are patterned as appropriate. With this configuration, an unsintered capacitance forming unit 18 and unsintered covers 19 are formed in the multi-layer unit 16.

3.2 Step S02: Formation of Side Margin

In Step S02, unsintered side margins 17 are provided to the side surfaces S of the multi-layer unit 16 produced in Step S01, to produce an unsintered ceramic body 11. Hereinafter, description will be given on an example of a method of providing the unsintered side margins 17 to the side surfaces S of the multi-layer unit 16 in Step S02.

Figure 7:
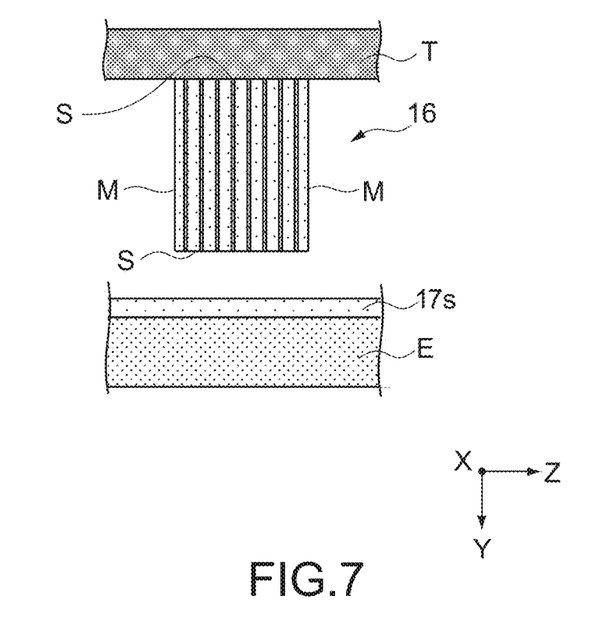
FIG. 7 is a cross-sectional view schematically showing Step S02 of the production method described above.

First, as shown in FIG. 7, a ceramic sheet 17s is disposed on a flat plate-like base member E, and one side surface S of the multi-layer unit 16, the other side surface S of which is held with a tape T, is caused to face the ceramic sheet 17s. The base member E is made of, for example, a soft material having a small Young's modulus, such as a silicone-based elastomer.

The ceramic sheet 17s is formed as a large-sized dielectric green sheet for forming the unsintered side margin 17. The ceramic sheet 17s can be formed into a flat sheet having a uniform thickness by using, for example, a roll coater or a doctor blade.

Figure 8:
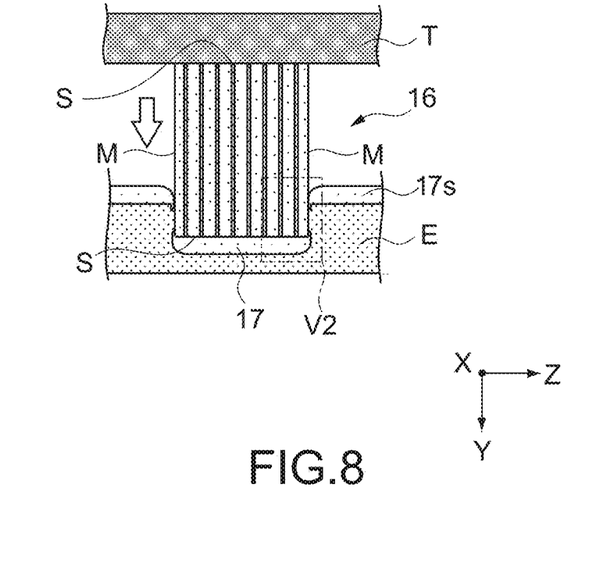
FIG. 8 is a cross-sectional view schematically showing Step S02 of the production method described above.

Next, as shown in FIG. 8, the ceramic sheet 17s is pressed by the side surface S of the multi-layer unit 16. The multi-layer unit 16 locally sinks deep into the base member E having a low Young's modulus together with the ceramic sheet 17s. With this configuration, the portion of the ceramic sheet 17s, which is sunk together with the multi-layer unit 16, is cut off as a side margin 17.

Figure 9:
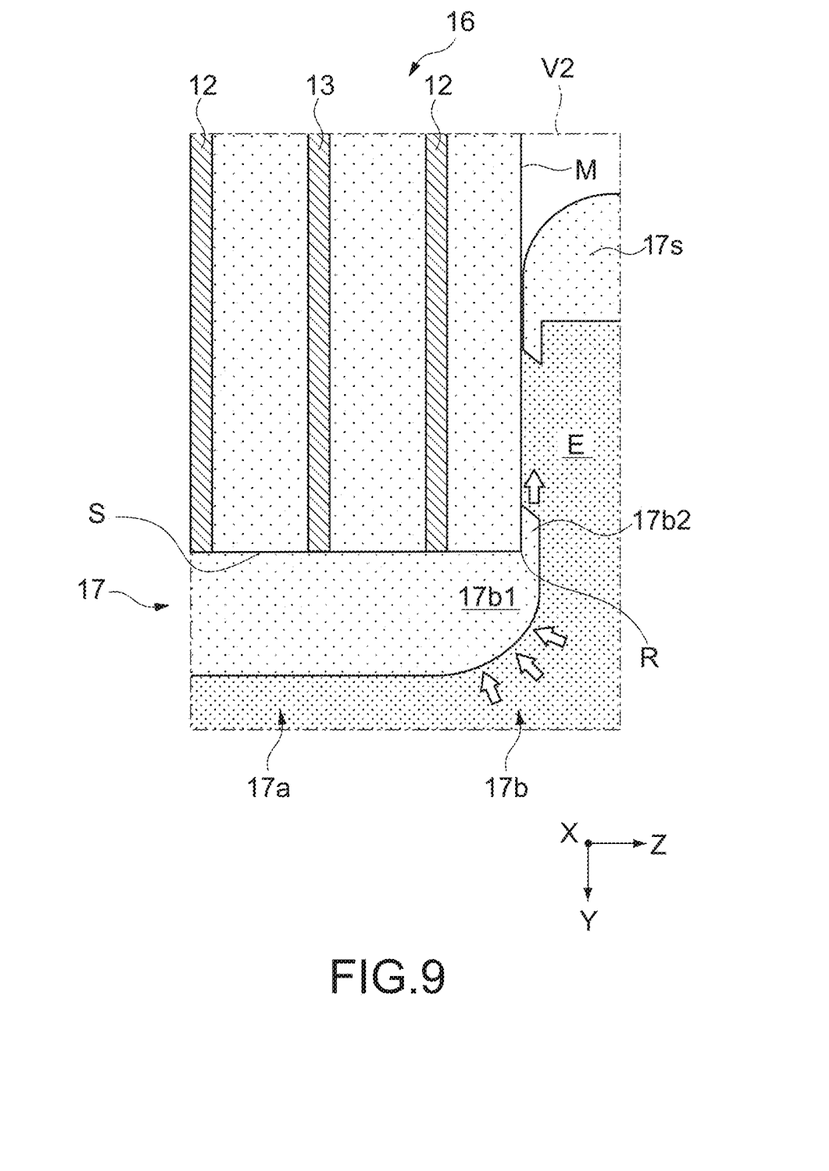
FIG. 9 is a partially enlarged cross-sectional view of a region V2 of FIG. 8.

FIG. 9 is a partially enlarged cross-sectional view of a region V2, which is surrounded by a chain line of FIG. 8. The side-surface-covering portion 17a of the side margin 17 receives a pressing force substantially uniform in the Y-axis direction while being sandwiched between the side surface S of the multi-layer unit 16 and the base member E. Accordingly, in the side-surface-covering portion 17a, the flat shape of the ceramic sheet 17s is maintained.

Meanwhile, the corner of the end portion 17b of the side margins 17 is removed and rounded by a pressing force applied from the base member E around the end portion 17b. This leads to the formation of the curved portion 17b1. Further, the end portion 17b is extended along the main surface M of the multi-layer unit 16 when being cut off from the ceramic sheet 17s. This leads to the formation of the extended portion 17b2.

In such a manner, in Step S02, plastic working is additionally performed on the curved portion 17b1 and the extended portion 17b2. In the curved portion 17b1 and the extended portion 17b2, voids gradually disappear in the course of plastic deformation, which progresses the densification. Accordingly, the curved portion 17b1 and the extended portion 17b2 that form the end portions 17b have a higher degree of compactness than that of the side-surface-covering portion 17a.

The thickness t and the extended amount d of the extended portion 17b2 can be controlled by, for example, a speed at which the multi-layer unit 16 is pressed and the ceramic sheet 17s is caused to sink into the base member E. Further, the thickness t and the extended amount d of the extended portion 17b2 can also be adjusted by the amount of a binder or solvent in the ceramic sheet 17s.

The Young's modulus of the base member E is favorably 10 kPa or more and 20 MPa or less, and more favorably, 10 kPa or more and 1 MPa or less. With this configuration, a shear force to be applied to the ceramic sheet 17s along the ridge R of the multi-layer unit 16 is suppressed, and the curved portion 17b1 and the extended portion 17b2 can be optimally formed.

Figure 10:
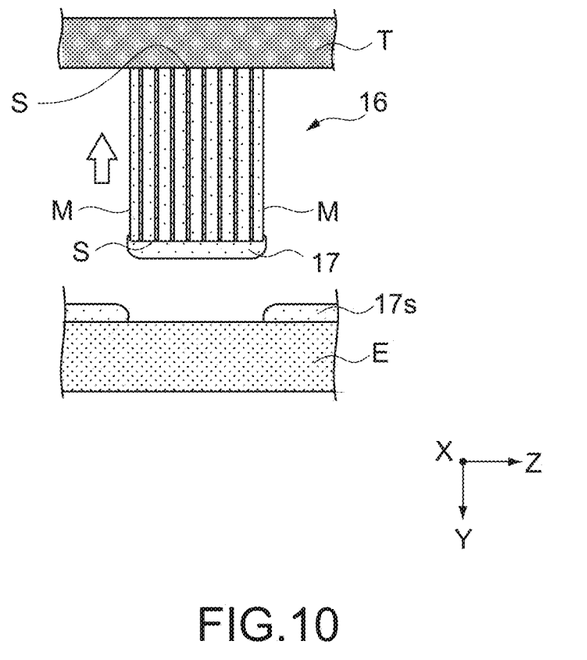
FIG. 10 is a cross-sectional view schematically showing Step S02 of the production method described above.

When the multi-layer unit 16 is moved upward in the Y-axis direction so as to separate from the base member E as shown in FIG. 10, only the part of the side margin 17, which is attached to the side surface S of the multi-layer unit 16, separates from the base member E. With this configuration, the side margin 17 is formed on one side surface S of the multi-layer unit 16.

Subsequently, the orientation of the side surface S of the multi-layer unit 16 in the Y-axis direction is inverted by transferring the multi-layer unit 16 to a tape different from the tape T shown in FIG. 10. In the manner similar to the above, the side margin 17 is formed also on the side surface S on the other side of the multi-layer unit 16, on which the side margin 17 is not formed. This provides an unsintered ceramic body 11.

It should be noted that a method of forming the side margins 17 is not limited to the above method as long as the end portion 17b including the curved portion 17b1 and the extended portion 17b2 can be formed. For example, the side margins 17, which are formed on the side surfaces S of the multi-layer unit 16 by an optional publicly known technique, may be subjected to ex-post plastic working to form the curved portion 17b1 and the extended portion 17b2.

3.3 Step S03: Sintering

In Step S03, the unsintered ceramic body 11 obtained in Step S02 is sintered to produce the ceramic body 11 of the multi-layer ceramic capacitor 10 shown in FIGS. 1 to 3. In the side margins 17 of the ceramic body 11, the porosity of the end portions 17b having a higher degree of compactness is lower than the porosity of the side-surface-covering portion 17a.

A sintering temperature in Step S03 can be determined on the basis of a sintering temperature for the ceramic body 11. For example, when a barium titanate ($BaTiO_3$) based material is used, the sintering temperature can be set to approximately 1,000 to 1,300° C. Further, sintering can be performed in a reduction atmosphere or a low-oxygen partial pressure atmosphere, for example.

3.4 Step S04: Formation of External Electrode

In Step S04, the first external electrode 14 and the second external electrode 15 are formed on both the end portions of the ceramic body 11 in the X-axis direction obtained in Step S03, to produce the multi-layer ceramic capacitor 10 shown in FIGS. 1 to 3. A method of forming the first external electrode 14 and the second external electrode 15 in Step S04 is optionally selectable from publicly known methods.

By the above steps, the multi-layer ceramic capacitor 10 is completed. In this production method, the side margins 17 are provided to the side surfaces S, from which the first and second internal electrodes 12 and 13 are exposed, of the multi-layer unit 16 in a later step. Thus, the positions of the end portions of the first and second internal electrodes 12 and 13 in the Y-axis direction in the ceramic body 11 are aligned with one another along the Z-axis direction with variations of 0.5 µm or less.

4. Example and Comparative Example

For each of Example and Comparative example of this embodiment, 1,000 samples of the multi-layer ceramic capacitor 10, which have the thickness t and the extended amount d of the extended portion 17b2 that are variously different from one another, were produced, and evaluation was performed on each of the samples. The samples according to Example and Comparative example were common in the configurations other than the thickness t and the extended amount d of the extended portion 17b2.

In each multi-layer ceramic capacitor 10 according to Example, the thickness t of the extended portion 17b2 was set to 0.1 µm or more and 3 µm or less, and the extended amount d of the extended portion 17b2 was set to 0.1 µm or more and 10 µm or less. In the multi-layer ceramic capacitors 10 according to Comparative example, the thickness t and the extended amount d of the extended portion 17b2 were set to 0 µm, that is, the extended portion 17b2 was not provided.

The samples according to Example and Comparative example were evaluated for the occurrence of peeling of the side margin 17. More specifically, each sample was observed with an optical microscope to determine whether the side margin 17 was peeled or not. Subsequently, the number of samples in which the side margin 17 was peeled was counted for each configuration.

Figure 11A:
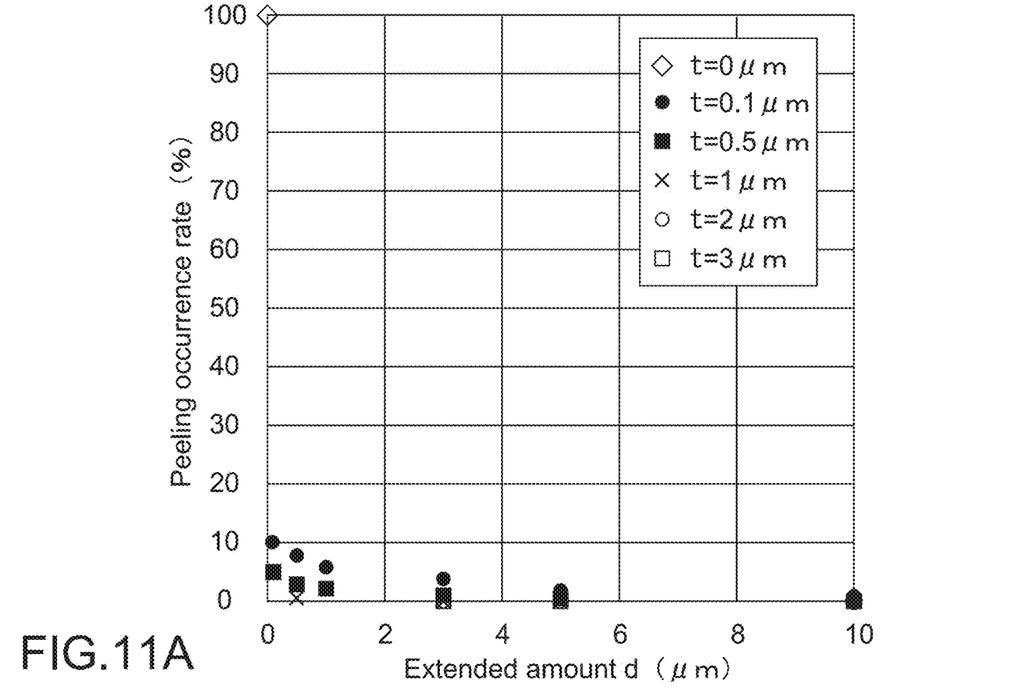
FIG. 11A is a graph showing evaluation results of a peeling occurrence rate of a side margin sheet according to Examples.

FIG. 11A is a graph showing a peeling occurrence rate, which is a rate of samples in which the side margin 17 is peeled, by plotting for each configuration. Further, in FIG. 11A, the horizontal axis represents the extended amount d of the extended portion 17b2, the vertical axis represents the peeling occurrence rate, and configurations having an equal thickness t of the extended portion 17b2 are indicated by using a common type of plotting.

As shown in FIG. 11A, in the multi-layer ceramic capacitors 10 according to Comparative example, in which the thickness t and the extended amount d of the extended portion 17b2 were 0 µm, the peeling occurrence rate was 100%. In contrast to this, in the multi-layer ceramic capacitors 10 according to Example, the peeling occurrence rate was 10% or less in any configuration.

Accordingly, in the multi-layer ceramic capacitor 10, it was confirmed that if the extended portion 17b2 having the thickness t and the extended amount d, which are each 0.1 µm or more, is provided, the peeling of the side margin 17 is dramatically difficult to occur. Therefore, in the multi-layer ceramic capacitor 10 according to the embodiment, high moisture resistance is obtained.

Figure 11B:
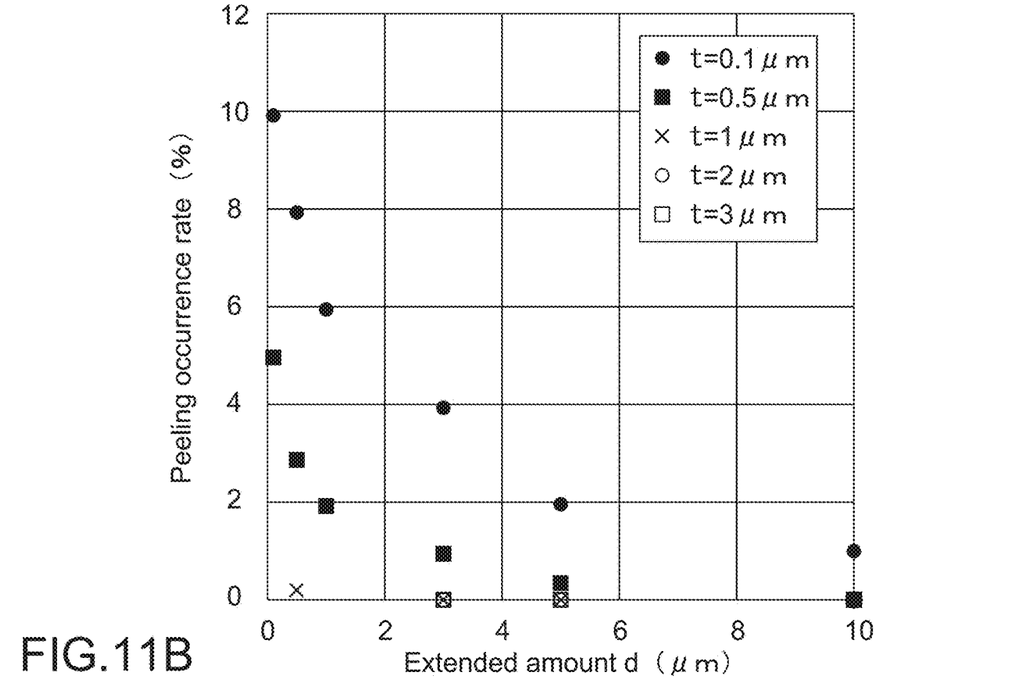
FIG. 11B is a graph showing evaluation results of the peeling occurrence rate of the side margin sheet according to Examples.

FIG. 11B is a graph showing, in an enlarged manner, only a region having a low peeling occurrence rate in FIG. 11A. In a region in which the extended amount d of the extended portion 17b2 is 5 µm or more, the peeling occurrence rate is 2% or less at any thickness t. Therefore, in the multi-layer ceramic capacitor 10, if the extended amount d of the extended portion 17b2 is set to 5 µm or more, higher moisture resistance is obtained.

Further, in the configuration in which the thickness t of the extended portion 17b2 is 0.5 µm or more, the peeling occurrence rate is significantly low. Accordingly, in a case where the thickness t of the extended portion 17b2, which is 0.5 µm or more, can be ensured, and if the extended amount d of the extended portion 17b2 is set to 1 µm or more, the peeling occurrence rate can be suppressed to be 2% or less in a manner similar to that above.

5. Other Embodiments

While the embodiment of the present disclosure has been described, the present disclosure is not limited to the embodiment described above, and it should be appreciated that the present disclosure may be variously modified.

For example, in the embodiment described above, the multi-layer ceramic capacitor 10 has been described as an example of a multi-layer ceramic electronic component, but the present disclosure can be applied to general multi-layer ceramic electronic components. Examples of such multi-layer ceramic electronic components include a chip varistor, a chip thermistor, and a multi-layer inductor.

What is claimed is:

1. A multi-layer ceramic electronic component, comprising
a multi-layer unit including
ceramic layers laminated in a first direction,
internal electrodes disposed between the ceramic layers,
a main surface that faces in the first direction, and
a side surface that faces in a second direction orthogonal to the first direction, the internal electrodes being exposed from the side surface; and
a side margin including
a side-surface-covering portion that is disposed on the side surface, and
an end portion that includes an extended portion extending from the side surface to the main surface and having a first dimension of 0.1 µm or more in the first direction and a second dimension of 0.1 µm or more in the second direction,
wherein the first dimension is 3 µm or less, and
wherein the second dimension is 10 µm or less.

2. The multi-layer ceramic electronic component according to claim 1, wherein
the second dimension is 5 µm or more.

3. The multi-layer ceramic electronic component according to claim 1, wherein
the first dimension is 0.5 µm or more, and
the second dimension is 1 µm or more.

4. The multi-layer ceramic electronic component according to claim 1, wherein
the side-surface-covering portion has a dimension of 10 µm or more in the second direction, and
the side-surface-covering portion has a porosity of 10% or less.

5. The multi-layer ceramic electronic component according to claim 4, wherein
the end portion has a porosity lower than the porosity of the side-surface-covering portion.

* * * * *